United States Patent [19]

Mori

[11] Patent Number: 5,103,392

[45] Date of Patent: Apr. 7, 1992

[54] SYSTEM FOR STORING HISTORY OF USE OF PROGRAMS INCLUDING USER CREDIT DATA AND HAVING ACCESS BY THE PROPRIETOR

[75] Inventor: Ryoichi Mori, Tokyo, Japan

[73] Assignee: Fujitsu Limited, Kawasaki, Japan

[21] Appl. No.: 622,196

[22] Filed: Dec. 5, 1990

Related U.S. Application Data

[63] Continuation of Ser. No. 281,882, Dec. 8, 1988, abandoned, which is a continuation of Ser. No. 129,867, Dec. 4, 1987, abandoned, and a continuation of Ser. No. 657,794, Oct. 4, 1984, abandoned.

[30] Foreign Application Priority Data

| Oct. 5, 1983 [JP] | Japan | 58-186100 |
| Mar. 12, 1984 [JP] | Japan | 59-46923 |
| Mar. 12, 1984 [JP] | Japan | 59-46924 |

[51] Int. Cl.⁵ .................................................. G06F 9/06
[52] U.S. Cl. .................................... 395/725; 364/284.4; 364/286.5; 364/DIG. 1
[58] Field of Search ... 364/200 MS File, 900 MS File

[56] References Cited

U.S. PATENT DOCUMENTS

| 3,719,927 | 3/1973 | Michels et al. | 364/406 |
| 3,956,615 | 5/1976 | Anderson | 235/381 |
| 4,358,672 | 11/1982 | Hyatt et al. | 235/380 |
| 4,433,207 | 2/1984 | Best | 178/22.09 |
| 4,453,074 | 6/1984 | Weinstein | 235/380 |
| 4,484,217 | 11/1984 | Block | 358/84 |
| 4,553,252 | 11/1985 | Egendorf | 364/300 |
| 4,590,557 | 5/1986 | Lillie | 364/200 |
| 4,593,376 | 6/1986 | Volk | 364/900 |
| 4,658,093 | 4/1987 | Hellman | 380/4 |
| 4,683,553 | 7/1987 | Mollier | 364/900 |

FOREIGN PATENT DOCUMENTS 0116327 1/1984 European Pat. Off. .

OTHER PUBLICATIONS

Lexis Handbook, Mead Data Corp., copyrighted 1980.
Lexis/Nexis-Quick Reference, copyrighted 1984.
"Computer Assisted Prior Art Searching", by Becker & Bolton, Jrnl of Patent Office Society, Oct. 1983, vol. 65, No. 10 pp. 536-585.
"Phone Home Video, The Game Connection", by Jacobs, Video Review, Sep. 1983, pp. 33, 34, 120.

Primary Examiner—Lawrence E. Anderson
Attorney, Agent, or Firm—Staas & Halsey

[57] ABSTRACT

A system for storing data on the history of use of programs consisting of a data processing apparatus and a program storage unit, such as a magnetic tape, which stores program-specific data. The data processing apparatus includes a user-specific credit data storage portion, a use decision portion, and a program use history storage portion which can store use history data derived from the program-specific data from the program storage unit or the user-specific credit data from the user-specific credit data storage portion. The program use history is accessible to proprietors of the programs so that charges can be based on actual use of the programs.

3 Claims, 10 Drawing Sheets

SYSTEM FOR STORING HISTORY OF USE OF PROGRAMS INCLUDING USER CREDIT DATA AND HAVING ACCESS BY THE PROPRIETOR

This application is a continuation of application Ser. No. 07/281,882, filed Dec. 8, 1988, now abandoned, is a continuation of co-pending application Ser. No. 129,867 filed on Dec. 4, 1987 and Ser. No. 657,794 filed on Oct. 4, 1984, both now abandoned.

BACKGROUND OF THE INVENTION

1. Field of the Invention

The present invention relates to a system for storing the history of use of marketable programs (software) such as marketable computer programs. By storage of the history of use, proprietors of marketable programs can charge for the exact amount of use of the software. Specifically, the system allows proprietors to obtain information on the exact state of use of software by a specific user and charge appropriately for that use, thus making the use of such software more attractive to users.

2. Description of the Prior Art

In general, it is difficult for a proprietor of software such as a computer program to protect and to extract the full benefits of his software rights. Once software is passed into the hands of a customer, the proprietor has no way of knowing how the software is used. He therefore cannot stop unauthorized use or copying, and cannot utilize a system of charges based on the amount of actual use. This has not only resulted in relatively high charges for the use of software, but has also discouraged software suppliers from the production of good software and promotes a general decline in the quality of software on the market. Obviously, this situation is detrimental to progress and the wider use of software in the future.

A method has been proposed for preventing unauthorized copying of computer programs, in which the program is coded for the particular computer unit on which use is authorized. This method is disclosed, for example, in Japanese Examined Patent Publication (Kokoku) No. 53-17849. The program can be used only when this code corresponds to that of the computer on which use is attempted. This prevents use of unauthorized copies of the program on other computer units. The control and management of such computer codes, however, is not easy or practical in the case where the computer program is mass-marketed.

SUMMARY OF THE INVENTION

It is an object of the invention to provide a system in which the use of a program is recorded every time the program is used.

It is another object of the invention to provide a system in which the proprietor of a program can charge for the exact amount of use of his program and can claim damages upon unauthorized use thereof.

It is a still further object of the invention to provide a system in which the users of a program are actually encouraged to copy the program, whereby extensive utilization of well-designed programs is promoted.

In accordance with a fundamental aspect of the present invention, there is provided a system for storing data on the history of use of programs, including a data processing apparatus used by a user and program storage means for storing a program acquired from a proprietor and program-specific data. The data processing apparatus includes user-specific credit data storage means for storing data identifying the user of the data processing apparatus and indicating credit for payment capacity, use time length, or the like of the user of the data processing apparatus. Also included is use decision means for determining permission to use the program on the data processing apparatus on the basis of program-specific data supplied from the program storage means or user-specific credit data supplied from the user-specific credit data storage means, the use decision means delivering either an affirmative or negative signal corresponding to results of the decision. Also included is program use history storage means connected to the use decision means for storing program use history data derived from the program-specific data or the user-specific credit data. In this system, the program use history data is rendered accessible to the proprietors of the programs used in the data processing apparatus.

DESCRIPTION OF THE PREFERRED EMBODIMENTS

Figure 1:
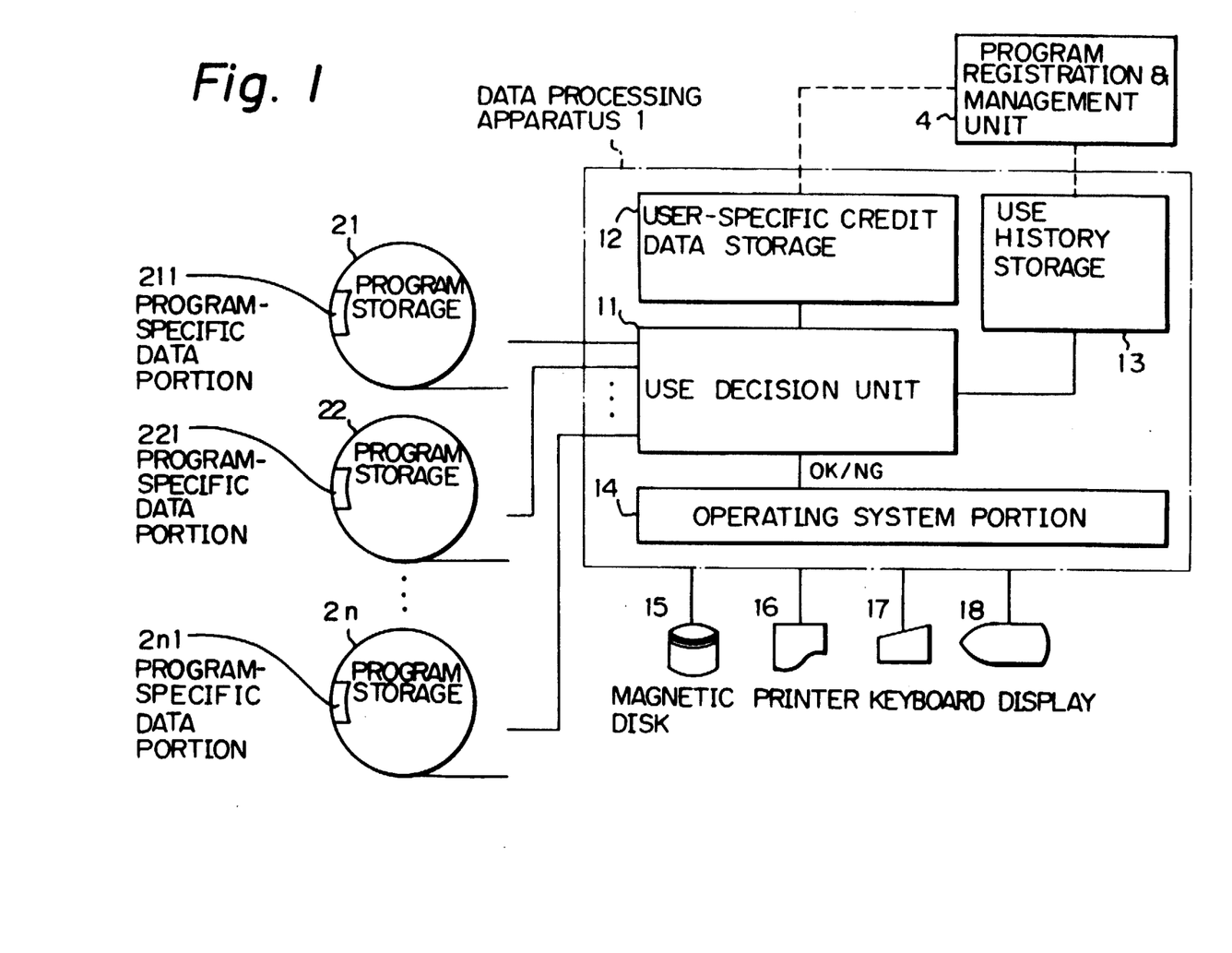
FIG. 1 is a block diagram of a system for storing data on the history of use of computer programs according to the present invention.

A system for storing data on the history of use of programs according to an embodiment of the present invention is shown in FIG. 1. The system shown in FIG. 1 includes a data processing apparatus 1 such as a computer used by a previously approved user, marketable program storages 21, 22, . . . 2n such as magnetic tapes or magnetic disks, and a program registration and management unit 4.

The data processing apparatus 1 is operated when one of the program storages 21, 22 . . . 2n is entered into the data processing apparatus 1.

The data processing apparatus 1 includes a use decision unit 11, a user-specific credit data storage 12, a use history storage 13, and an operating system portion 14. One of the program storages 21, 22, . . . 2n is entered into the use decision unit 11. The user-specific credit data storage 12 is connected to the use decision unit 11. The use decision unit 11 supplies an OK/NG (no good) signal to the operating system portion 14 and an output signal to the use history storage 13 and receives a signal from the use history storage 13.

An output signal of the use history storage 13 can be supplied to the program registration and management unit 4, which can send a signal to the user-specific credit data storage 12. In addition to the program for operating the user's computer, the program storages 21, 22, . . . , 2n store the program-specific data of portions 211, 212, . . . 2n.

The user-specific credit data storage 12 stores data indicating the user's authorization to use the program to be entered into the computer 1, the user's ability to pay for the use of the program, the period of time the user is allowed to use the program, and the like. When, for example, the program-specific data from the program storage 21 is supplied to the use decision unit 11, the use decision unit 11 compares the program-specific data from the program-specific data portion 211 with the user-specific credit data from the user-specific credit data storage 12 and decides whether the user may use the program.

If the decision is affirmative, an OK signal is supplied to the operating system portion 14 to allow the subsequent operation of the computer to proceed. A data signal is supplied to the use history storage 13 to cause the program-specific data from the program-specific data portion 211 and/or the user-specific credit data from the user-specific credit storage 12 to be stored in the use history storage 13.

If the decision is negative, an NG (no good) signal is supplied to the operating system portion 14 to prevent subsequent operation of the computer from taking place.

Once the program-specific data or the user-specific credit data is stored in the use history storage 13, the program use history data is accessible to the proprietor of the programs executed on the data processing apparatus the Therefore, the proprietor can obtain the information necessary for charging the user for the exact amount of use of his program.

It is also possible to transmit the data stored in the use history storage 13 to the program registration and management unit 4, which is outside of the data processing apparatus 1. After predetermined data processing operations in the program registration and management unit 4, output data can be transmitted to the user-specific credit data storage 12 to update or change the data stored therein.

Figure 2:
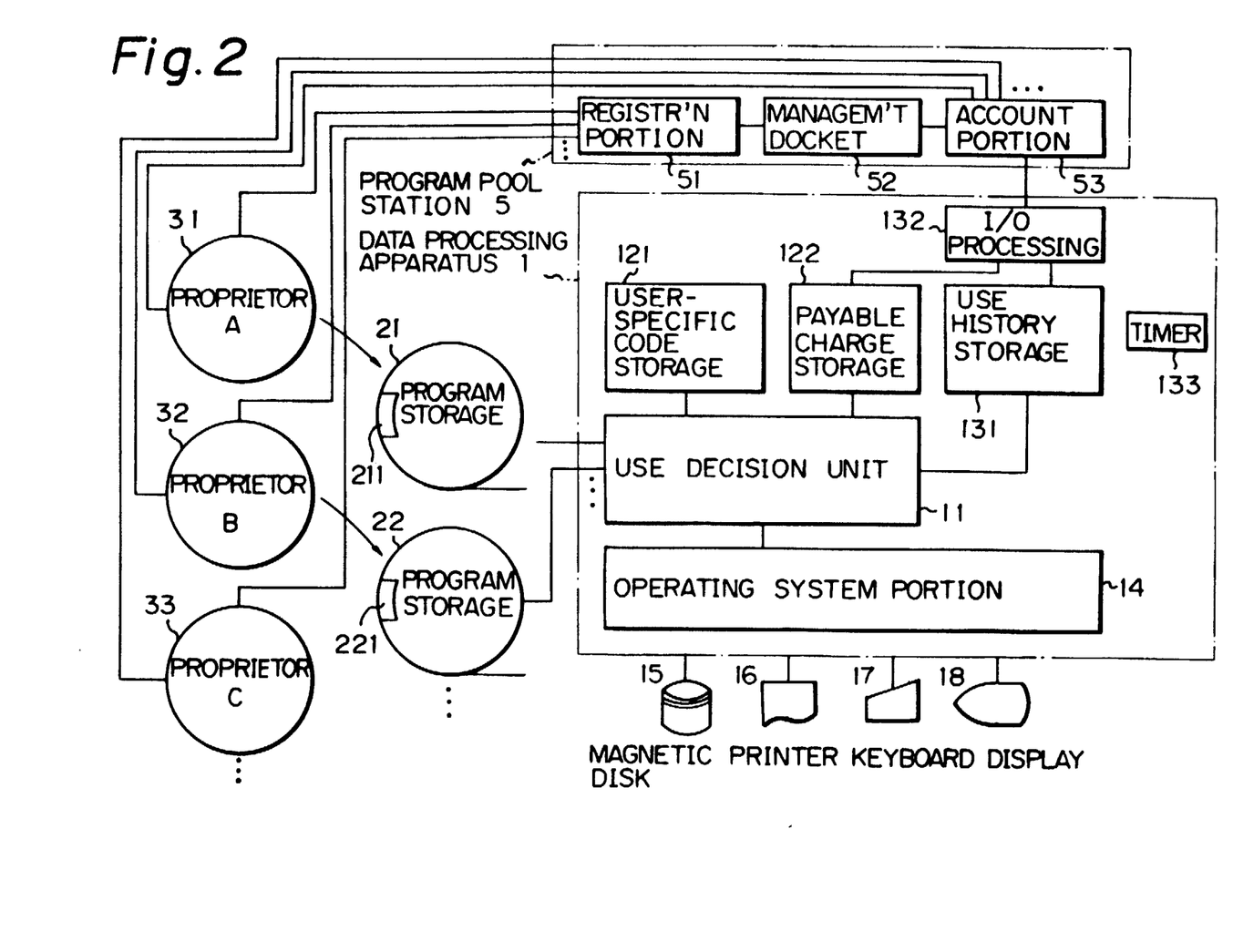
FIG. 2 is a block diagram of more detailed structure of the embodiment of the system shown in FIG. 1.

The detailed structure of the system shown in FIG. 1 is shown in FIG. 2. The user-specific credit data storage 12 is divided into two portions. One is a storage portion 121 for storing the user-specific code, the other is a storage portion 122 for storing data of the charge payable by the user as well as a currency unit, such as yen, dollars, or pounds. The use history storage 13 includes a main portion 131 of the use history storage 13, an input/output processing portion 132, and a timer portion 133. The data processing apparatus 1 also includes a magnetic disk device 15, a printer 16, a keyboard 17, and a display device 18.

The program registration and management unit 4 in the system shown in FIG. 1 is a program pool station 5 in the embodiment shown in FIG. 2. The program pool station 5 includes a registration portion 51, a management docket 52, and an account portion 53.

A proprietor of a program enters a bank account number at the registration portion 51 and receives a program-specific code (program proprietor identification code). The data processed in the registration portion 51 is written in and read from the management docket 52.

The account portion 53 is connected with the input/output processing portion 132 of the use history storage 13 in the data processing apparatus 1. The information of the charge payable by the user stored in the use history storage 131 may be a predetermined limit on the amount of cumulative charges of a user. The content of the use history storage 131 can be emptied when the data to be stored into the use history storage 131 exceeds the predetermined limit of the capacity of storage of data. When the charge to the user for use of the program in the data processing apparatus 1 is very high, information concerning such expensive use can be transmitted through the input/output processing portion 132 to the account portion 53 in the program pool station 5. Also, information on the balance of the charge payable by the user stored in the use history storage 131 can be revised to raise the limit of the cumulative charges stored in the use history storage 131 by instructions supplied through the input/output processing portion 132 from the account portion 53 in the program pool station 5.

The data transmission through the input/output processing portion 132 may be realized through various means, such as on-line data transmission, a magnetic card, or an IC card including a microprocessor therein.

The program storages 21, 22, . . . are mass-marketed by the proprietors of the programs 31, 32, 33, . . . . Before this, the proprietors register their programs at the program pool station 5. Later, they obtain accounts of the use of their programs by the users from the station 5. For example, the program-specific data is stored in the program-specific portion 211 of the program storage 21. The program-specific data includes the program-specific code supplied from the program pool station 5, the version number of the program, and the charge for use of the program.

It is possible to include information on a special contract concerning the use of the program in the program-specific data. In this case, the use decision unit 11 delivers an affirmative decision only when the data stored in the user-specific credit data storage 12 includes information indicating a special use contract code corresponding to the special contract information.

The information concerning such a special contract is usually supplied to the program pool station 5. Hence, it is possible for the proprietor of the program to obtain information concerning the use of his program, for which the special contract is designated, from the program pool station 5.

The system shown in FIG. 2 operates as follows. The entry of the marketable program storage 21 in the data processing apparatus 1 is detected by the operating system portion 14 by interpreting the job control language in the storage. Upon detection, the use decision unit 11 commences a comparison operation. The data from the user-specific code storage 121 and the payable charge storage 122 are compared with the program-specific data from the program storage 21.

A user balance in the data from the payable charge storage 122 has subtracted from it the charge for use of the program in the program-specific data. When the result of the subtraction is a negative number, this information is supplied to the operating system portion 14 to cause the display device to indicate that use of the program is impossible because the charge of use exceeds the balance. When the result of the subtraction is either zero or a positive number, information including the result of the subtraction, the program-specific code, the charge for use of the program, the user-specific code, and a new user balance is stored in the use history storage 13. Also, information of the continuation of the operation of the computer is supplied to the operating system to allow the operation of the computer to proceed.

Thus, in the use history storage 13, data of the user balance, i.e., the result of the subtractions of charges for uses of programs, the data of the program-specific code, and the data of the user-specific code stored. It is also possible to and determine, from the stored data, the total amount which should be paid by the user to the proprietors of the used programs.

The program pool station 5 can be controlled by an organization such as an association of the proprietors of computer programs. When the program pool station 5 is controlled by a proprietor association, the association obtains the information on the use of the programs stored in the use history storage 131.

It is possible to establish a contract between a program proprietor and a user to refund 10% of the charge for use of a program if the user gives the information on the program use to the proprietor. With such a contract, assuming, for example, prepayment by the user, it is in user's interest to give information on the program use to the proprietor. Therefore, collection of charges for use of the proprietor's program is ensured with a high probability.

Upon receipt of the information on use of the program from the user's data processing apparatus 1, the proprietor association collects the charge for use of the program from the user and transfers it to the bank account registered in the management docket 52 in the program pool station 5.

A similar procedure can be followed using an integrated circuit (IC) card. In such a case, the IC card is adopted as the means for data transmission through the input/output processing portion 132. It is possible for the program proprietor to contract with a user having an IC card so that the user brings back the card to the proprietor association in return for a cash refund. The amount of the cash refund payment may be 10% of the total of the charges for use of the program and the remainder of the user balance if a payable charge was prepaid by the user.

With such a contract, it is in the interest of the holder of the IC card to bring back his IC card to the proprietor association to obtain at least the 10% refund on the total of the charges for the use of the program, even if the remainder of the payable charge, i.e., user balance, is zero. Upon receipt of the IC card from the user, the proprietor association arranges for transfer of funds to the bank account of the proprietor.

With the proprietor association, the proprietor of a program can receive the charge for use of his program at his bank account through the proprietor association. Even if unauthorized copying of the program is carried out and the copied program is used, under a properly organized system, the charges for use of the copied program will be transferred to the bank account of the program proprietor through the proprietor association, since the program-specific data including the program proprietor identification code is stored in the program storage. Accordingly, use of the unauthorized copy does not detract from, but adds to the profit of the program proprietor.

Also, even if unauthorized copying of the program is carried out and an incorrect program proprietor identification code is unlawfully attached, the use history of the copy can be detected from the data stored in the use history storage 131, and hence damages can be claimed against the program proprietor identified by the incorrect program proprietor code.

Figures 3, 3A:
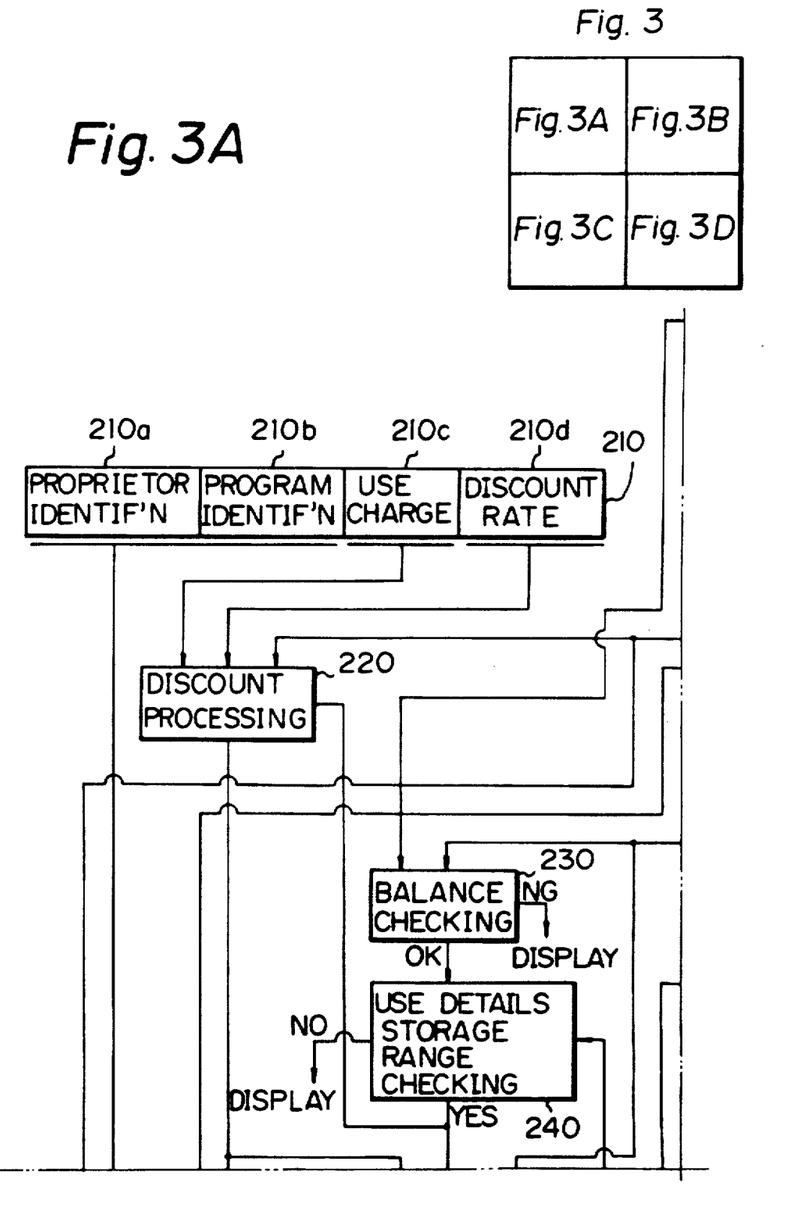
FIG. 3 an even more detailed block diagram of the structure and operation of the system shown in FIG. 1.
Figure 3B:
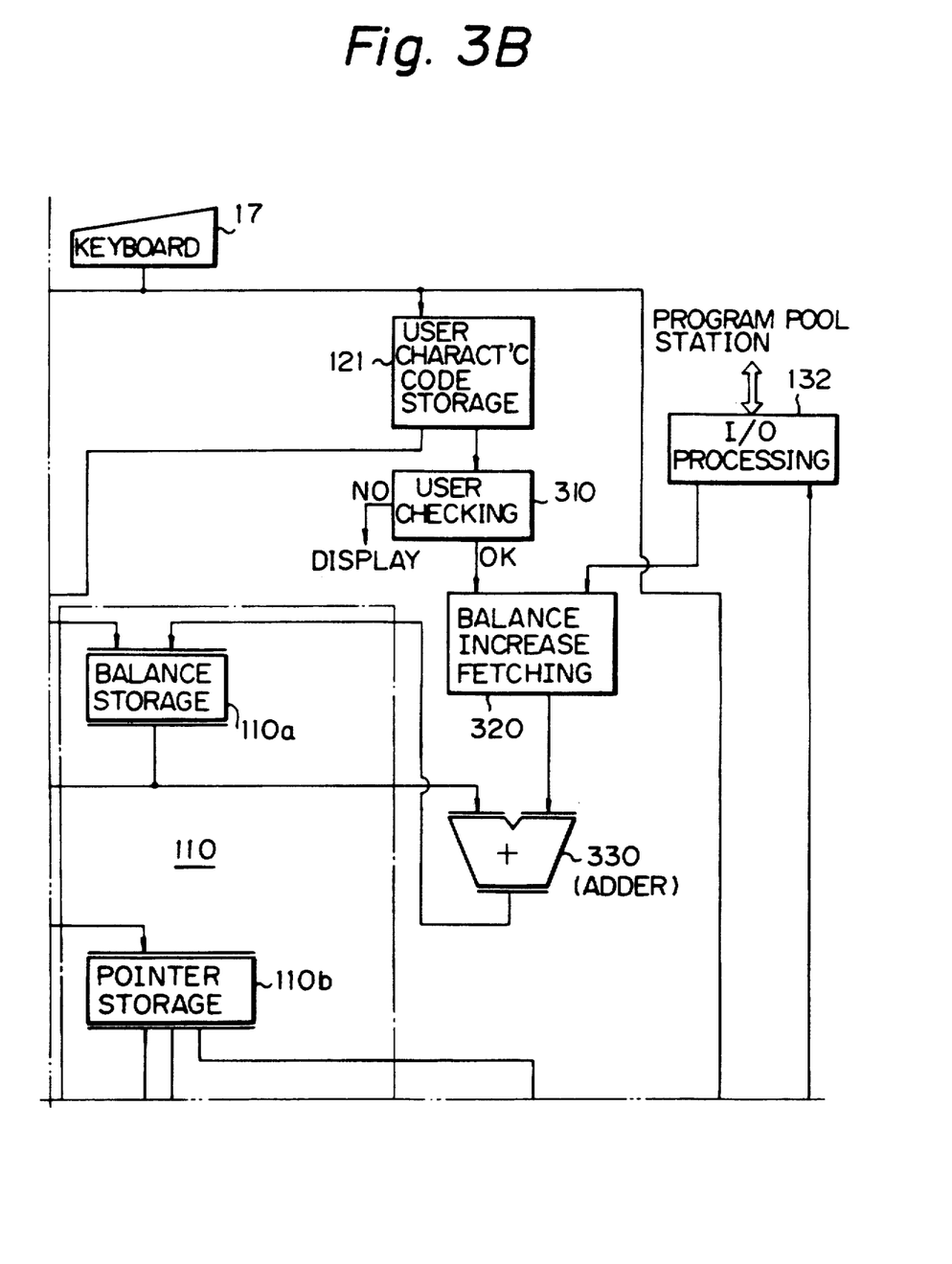
Figure 3C:
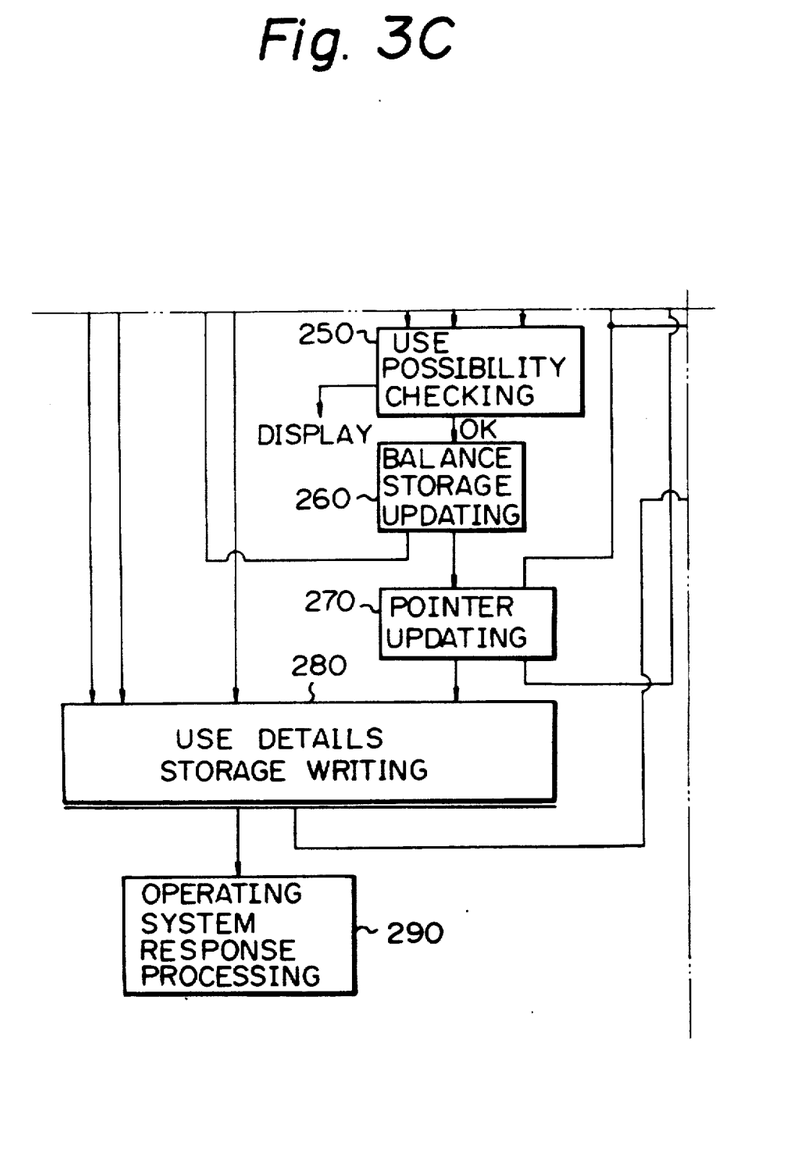
Figure 3D:
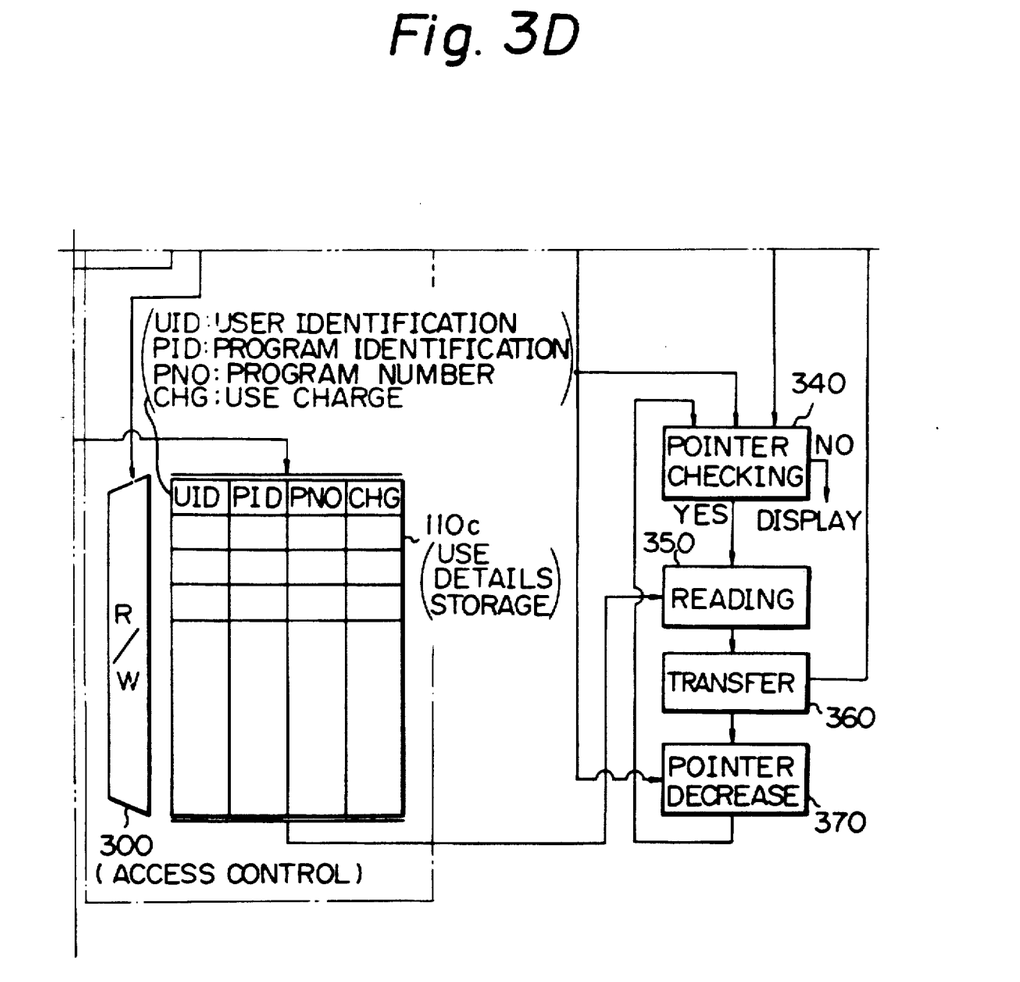

An example of detailed structure and functions of the system shown in FIG. 2 is illustrated in FIG. 3. The use history and payable charge data storage 110 includes a balance storage 110a, a pointer storage 110b, a use details storage 110c, and an access control portion 300 for the use details storage 110c. There is provided a program data memory 210 which includes a program proprietor identification code storage 210a, a program identification data storage 210b, a use charge storage 210c, and discount rate storage 210d.

There are provided a discount process 220, a balance checking portion 230, a use details storage range checking portion 240, a use possibility checking portion 250, and a balance storage updating portion 260. There are also provided a pointer updating portion 270, a use details storage writing portion 280, and an operating system response processing portion 290. There are also provided a user checking portion 310, a balance increase fetching portion 320, an adder portion 330, a pointer checking portion 340, a use history storage reading portion 350, a transfer portion 360, and a pointer decrement portion 370.

The operation of the system shown in FIG. 3 will now be described. First, the routine of the use of the program will be described. Upon receipt of an instruction from the keyboard 17, the information of the balance stored in the balance storage 110a is checked in the balance checking portion 230. When the result of the checking is either negative or zero, BALANCE ZERO is indicated on the display device 18. When the result of the checking is neither negative nor zero, the information stored in the pointer storage 110b is checked for whether or not the predetermined elements of the information exceed the maximum limit values. The maximum limit values may be determined by the number of items in the use details storage 110c or the sum for the charge of use of the program not reported to the proprietor association.

When the predetermined elements of the information exceed the maximum limit values, REMAINING CAPACITY OF USE DETAILS STORAGE INSUFFICIENT. PLEASE SEND USE DETAILS TO PROPRIETOR ASSOCIATION. (or PLEASE CHANGE IC CARD AT PROPRIETOR ASSOCIATION) is indicated on the display device 18.

When the predetermined elements of the information do not exceed the maximum limit values, the discount processing portion 220 calculates the charge for use of the program, by using the use charge from the use charge storage 210c, the discount rate from the discount rate storage 210d, and the user-specific code from the user-specific code storage 121. It is possible to set the charge for use of the program to provide a special discount for a special user, or a special discount, including no charge, for a user for a predetermined number of initial uses. Of course, when no information of a contract is detected in the user-specific credit data, THIS PROGRAM NOT AVAILABLE, BECAUSE OF ABSENCE OF CONTRACT may be indicated on the display device 18.

The use possibility checking portion 250 subtracts from the balance output by the balance storage 110a a calculated charge output by the the discount processing portion 220 and checks whether or not the result of the subtraction is a negative number. When the result is a negative number, BALANCE SHORTAGE is indicated on the display device 18. When the result is not a negative number, the balance storage-updating portion 260 updates the value of the balance storage 110a, and the pointer updating portion 270 updates the value of the pointer storage 110b to increment the value by 1. Then, the use details storage writing portion 280 stores the user identification code, the program proprietor identification data from the portion 210a, the program identification data from the portion 210b, and the amount of the calculated charge, including the currency unit, into the use details storage 110c. This storage into the use details storage 110c is carried out at the storage location designated by the pointer for the access control portion 300 stored in the pointer storage 110b. After that, the operating system response processing portion 290 delivers a signal indicating approval of use of the program to the operating system portion 14.

Instead of the above-described subtraction of the payable charge each time a program is used, it is possible to maintain the initial payable charge, i.e., not subtract the charges for use of the program, and to deliver the information of the result of subtraction from the initial payable charge of the sum of the charges for use of a program only when the delivery of the result is required.

Next, the routine for increasing of the value of the balance storage 110a will be described. Upon receipt of an instruction from the keyboard 17, the user checking portion 310 checks whether or not the user is entitled to use the program. For example, coincidence between the password code from the keyboard 17 and a code from the user-specific code storage 121 is checked. When no coincidence is found, PLEASE INPUT PASSWORD AGAIN is indicated on the display device 18. When coincidence is found, the amount of the balance which is to be increased is fetched in the balance increase fetching portion 320 using the signal from the input/output processing portion 132. This can be done by obtaining information concerning the amount of the balance to be increased from the keyboard 17 after exchanging on-line information concerning the password with the program pool station or by using an IC card connected to the input/output processing portion 132 for obtaining information concerning the amount by which the balance is to be increased.

The amount of by which the balance to be increased is added to the balance in the balance storage 110a by the adder portion 330, and the result of the addition in the adder portion 330 is stored in the balance storage 110a.

Next, the routine of the transfer of data from the use history storage 110 to the program pool station 5 will be described. Upon receipt of an instruction from the keyboard 17, the pointer value checking portion 340 checks the data in the pointer storage 110b for whether or not the pointer value is greater than zero. When the result of the check is that the pointer value is not greater than zero, TRANSFER OF USE DETAILS STORAGE DATA COMPLETED is indicated on the display device 18. When the result of the check is that the pointer value is greater than zero, the reading portion 350 reads the data of the use details storage 110c in the range designated by the pointer in the pointer storage 110b, and the transfer portion 360 transfers the read data directly to the program pool station 5 via the input/output processing portion 132. In the case where an IC card is used, the data is recorded on the IC card.

Then, the pointer value decreasing portion 370 decreases the pointer value by 1, and the process returns to the pointer checking portion 340. Thus, the process is repeated until the value of the pointer storage 110b reaches zero. Accordingly, all of the data in the use details storage 110c is transmitted to the program pool station 5.

It is possible to change the maximum limit value in the use details storage range checking portion 240 in accordance with the degree of credit of the user. Hence, it is possible to designate a relatively long interval for reports of the data in the use details storage 110c for a user with an excellent credit standing and to designate a relatively short interval for reports of the data in the use details storage 110c for a user with a poor credit standing.

Figure 4:
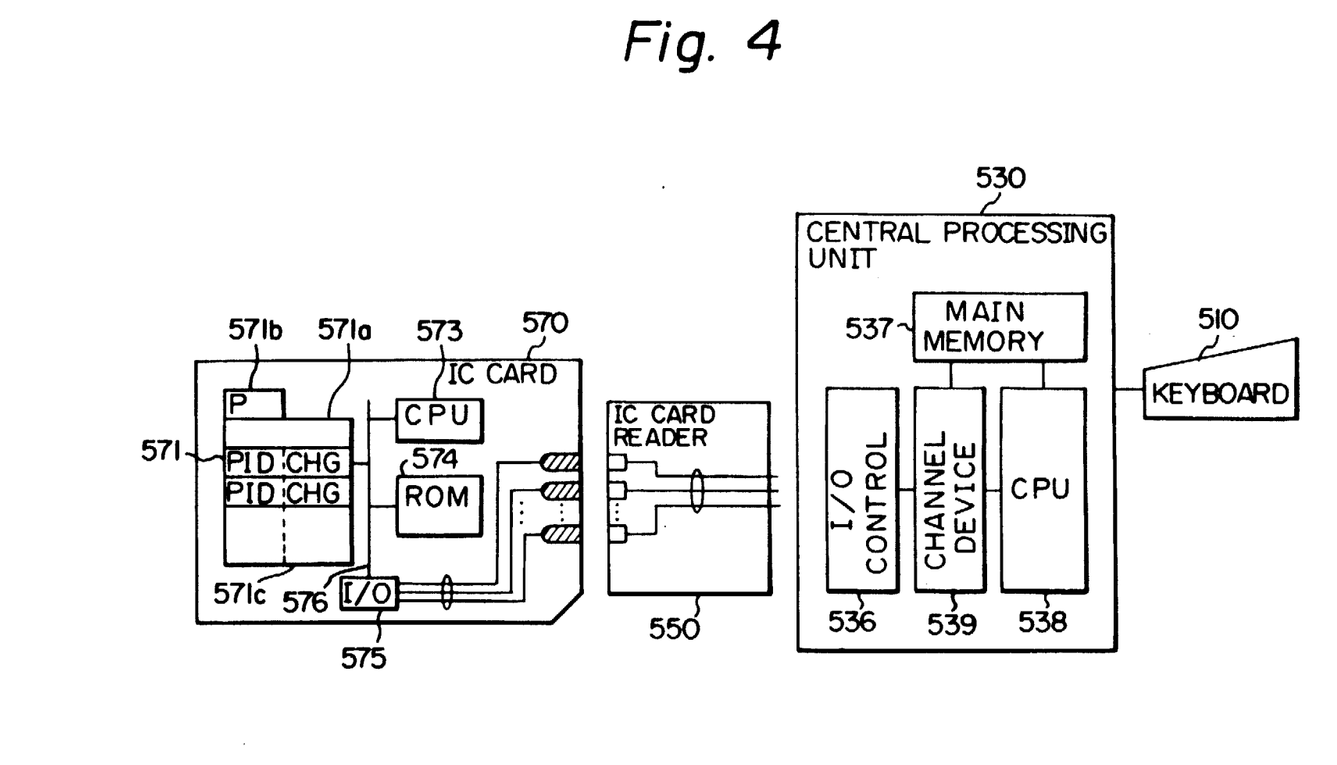
FIG. 4 is a block diagram of another example of the structure and operation of the system shown in FIG. 1.

An embodiment of the system in which an IC card is used is shown in FIG. 4. The system shown in FIG. 4 includes a central processing system 530 having a main memory 537, a central processor unit 538, a channel device 539, an input/output control device 536, and a keyboard 510; an IC card reader 550; and an IC card 570 having a microprocessor unit 573, a use history storage 571, an EPROM 574, an input/output port 575, and a bus 576. The use history storage 571 includes a balance storage 571a, a pointer storage 571b, and a use details storage 571c.

In the system shown in FIG. 4, whether or not the program can be used is checked by using the balance storage 571a. When the result of the check is affirmative, the data in the balance storage 571a is updated, by subtraction, and the details of the use of the program are stored in the use details storage 571c.

The purchase price of the IC card 570 paid by the user to the proprietor association is stored in the balance storage 571a in the IC card 570. After using the IC card to close to the extent allowed by the payable charge, the user returns the IC card 570 to the proprietor association. Assuming, for example, prepayment of the purchase price, upon receipt of the IC card 570, the proprietor association returns the balance stored in the balance storage 571a and 10% of the total of the charges for use of the program. It is possible accordingly for the proprietor association to pay the charge of use for a program to the proprietor.

It is possible to store in the EPROM 574 a program which forbids processing in the direction of increase of the balance in the balance storage 571a. It is also possible to encipher the program-specific data and distribute the enciphered program-specific data through the program. Such enciphered program-specific data is deciphered by using the key information stored in the IC card 570. These measures can prevent unauthorized use of the IC card 570. It is also possible to omit use of the user identification code to ensure the privacy of the user.

Another possibility is to adopt a system in which an indication that the amount of the balance in the balance storage 571a is approaching zero is displayed. It is also possible to allow the use of a program up to a predetermined negative balance in the balance storage 571a with an indication that the user is in such a negative condition. It is also possible for the proprietor association to cancel the service of the proprietor association for a user who has exceeded the above-mentioned predetermined negative balance. It is also possible to store, in the balance storage 571a, information concerning the increase of the payable charge in response to the insertion of coins.

It is possible either that the function of the use decision unit 11 in association with the user-specific credit data storage 12 and the use history storage 13 is included in the functions of the data processing apparatus 1 or that the above-mentioned function is carried out by a program service unit consisting of a use decision unit, a user-specific credit data storage, and a use history storage, this program service unit constituting a portion of the data processing apparatus 1.

It is also possible to encipher the marketable program and store in the IC card 570 key data for deciphering the enciphered marketable program, in order to prevent the program registration data from being changed at random without authorization.

Figures 5, 5A:
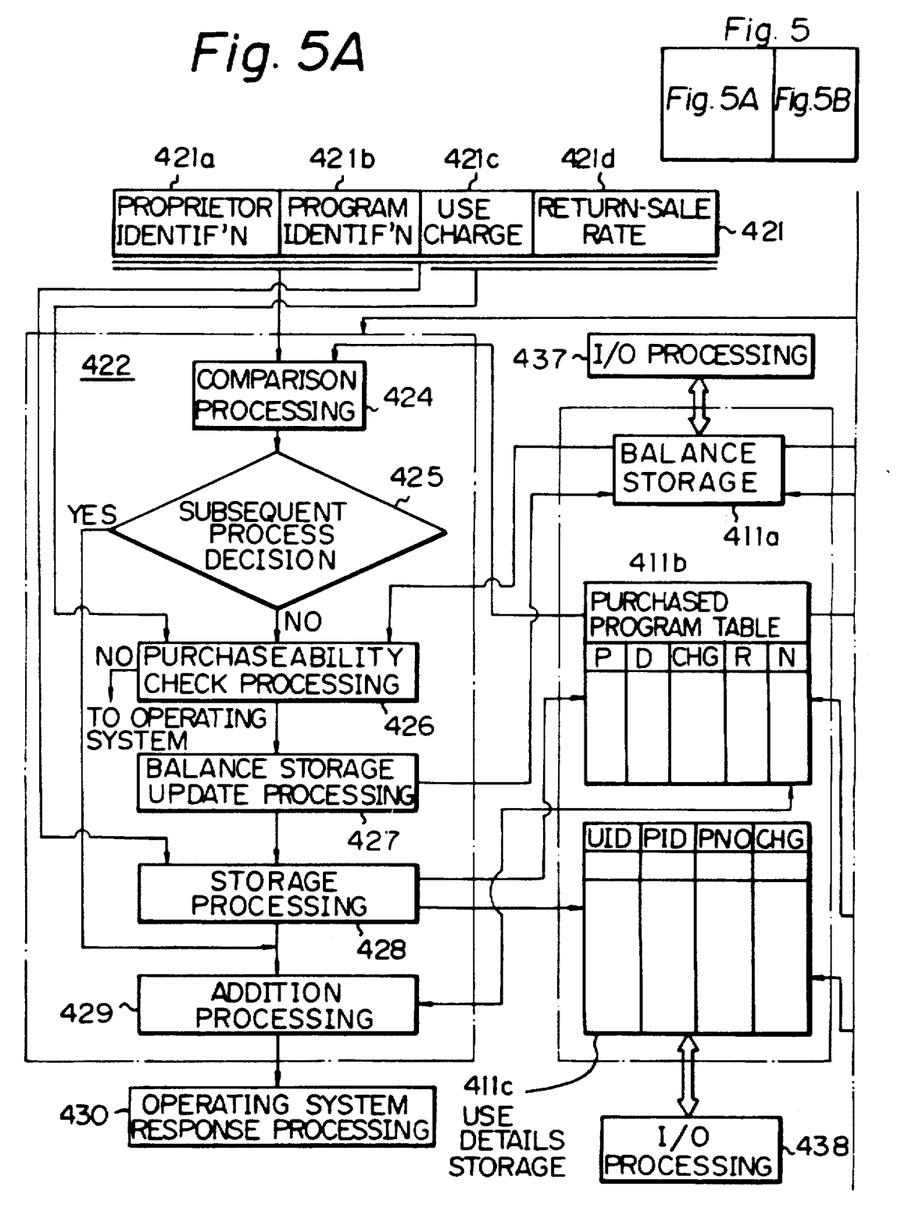
FIG. 5 is a block diagram of a further example of the structure and operation of the system shown in FIG. 1.
Figure 5B:
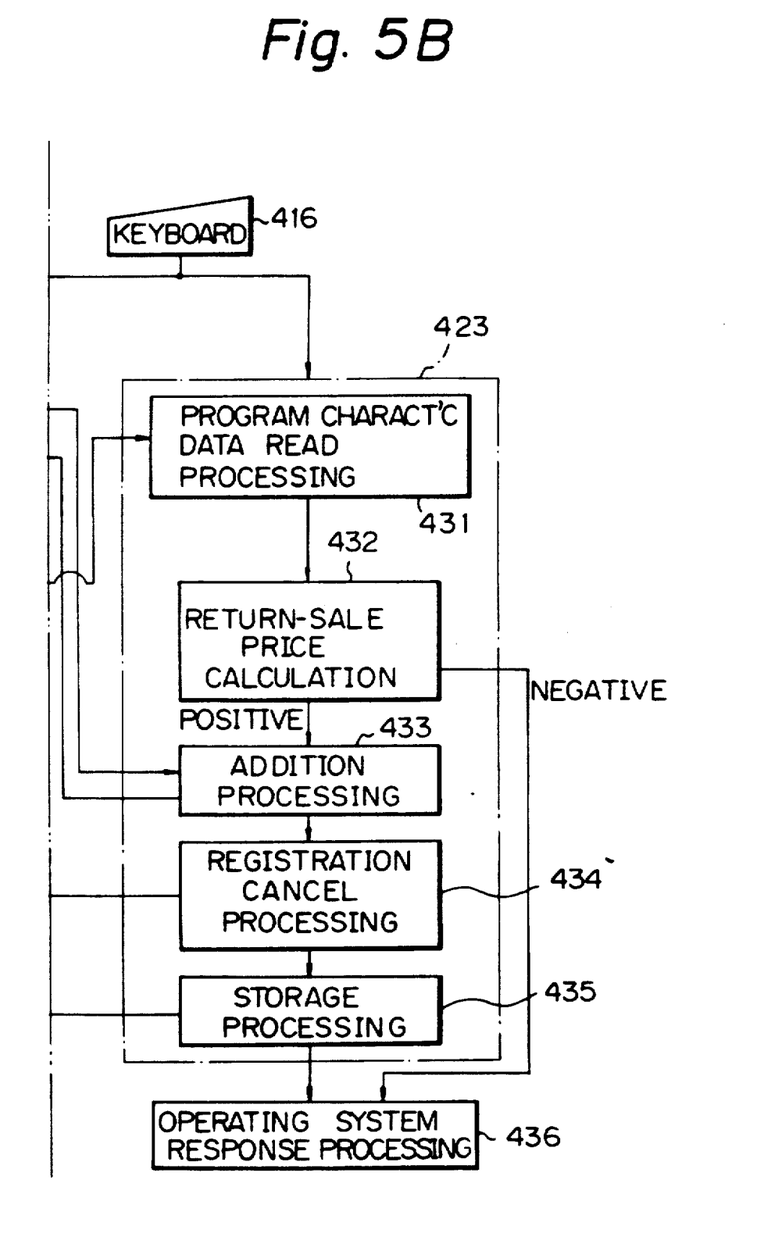

Another example of the detailed structure and the functions of the system shown in FIG. 2 is illustrated in FIG. 5. The system shown in FIG. 5 includes a program data storage 421, a decision and registration processing unit 422, a use history and payable charge data storage 411, and a registration cancel processing unit 423. The use history and payable charge data storage 411 includes a balance storage 411a, a purchased program table 411b, and a use details storage 411c.

The program data storage 421 stores program proprietor identification information 421a, a program-specific code 421b, program charge information 421c, and return-sale rate information 421d. The decision and registration processing unit 422 includes a comparison processing portion 424, a subsequent process decision portion 425, a purchaseability check processing portion 426, a balance storage update processing portion 427, a storage processing portion 428, and an addition processing portion 429.

A registration cancel processing unit 423 includes a program characteristic data read processing portion 431, a return-sale price calculation portion 432, an addition processing portion 433, a registration cancel processing portion 434, and a storage processing portion 435. There are also provided a keyboard 416, operating system response processing portions 430 and 436, and input/output processing portions 437 and 438.

Three major processes, that is, the process of use of a marketable program, the process of purchase of a marketable program, and the process of return-sale of the purchased program, are carried out in the system shown in FIG. 5. First, in the process of use of a marketable program, the use of a program is instructed by information delivered from the keyboard 416. Upon receipt of the instruction, the purchased program table 411b is accessed, and whether or not the purchased program in question is registered in the purchased program table is checked in the comparison processing portion 424. This check is carried out on the basis of whether or not the program identification code 421b is registered in the purchased program table 411b.

When the result of the check is affirmative, the subsequent process decision portion 425 causes the addition processing portion 429 to carry out the addition processing to update the value of N, which represents the total use time of the program in question in the table by value DN, assuming that DN is the time of one use. When the result of the check is negative, it is necessary to purchase the program in question, and program purchase processing is carried out.

Second, in the process of the purchase of a marketable program, the use charge 421c stored in the program-specific data storage 421 is compared with the balance stored in the balance storage 411a. When the result of the subtraction, from the balance stored in the balance storage 411a, of the use charge 421c stored in the program-specific data storage 421 is a negative number, NO REMAINDER is indicated on the display device 18 via the operating system response processing portion 430. When the result of the subtraction is a positive number, the amount of balance stored in the balance storage 411a is updated by subtracting, from the balance stored in the balance storage 411a, the use charge 421c stored in the program-specific data storage 421.

Then, the storage processing portion 428 stores the program-specific data 421a, 421b, 421c, and 421d in the purchased program table 411b and the use details storage 411c. The use details storage 411c is controlled, for example, by the maximum value of the pointer so that the number of columns is limited to that in which the writing of data is allowable. After that, the use time is added in the addition processing portion 429, and the response to the operating system is carried out in the operating system response processing portion 430.

Third, in the process of return-sale of the purchased program, the user operates the keyboard 416 to designate the program which the user wishes to sell in the form of return-sale. Upon receipt of this instruction, the program-specific data read processing portion 431 reads the program-specific data and the use time data N for the program in question from the purchased program table 411b.

Then, the return-sale price calculation portion 423 calculates the return-sale price by using the use charge 421c, the use time, and the return-sale rate 421d. The equation of such calculation is, for example, "RETURN-SALE PRICE = USE CHARGE $\times (1 - N \times R)$". In this equation, R is selected as 0.001 under the condition that the return-sale is possible only within the use time of 1000 hours.

When the result of the calculation according to this equation is negative, the information of the result is transmitted to the operating system to display NO REFUND EVEN IF CANCELLATION IS EFFECTED on the display device 18. When the result of the calculation is positive, the value of the balance storage 411a is updated by the addition of the result of the calculation to the value of the balance storage 411a, and the registration cancel processing portion 434 cancels the contents corresponding to the program in question from the purchased program table 411b. After that, the storage processing portion 435 records the information that the program in question has been sold in the form of return-sale in the use details storage 411c, and the process proceeds to the operation in the operating system response processing portion 436.

It is possible to obtain the price of the return-sale by storing the date of purchase of the program in question in the purchased program table 411b, obtaining the holding period from the return-sale price calculation portion 432 by the difference between the current date and the date of purchase of the program in question stored in the purchased program table 411b, and obtaining the price of the return-sale by applying the above-obtained holding period to the return-sale function. The calender mechanism used in recent data processing systems may be adopted in the above-described system for obtaining the price of the return-sale.

The balance storage 411a is updated by the external information provided through the input/output processing portion 437 by increasing the value of the balance storage 411a either by the operation of the IC card purchased from the proprietor association or directly by on-line operation. The direct on-line transmission of the information of the contents of the use details storage 411c to the proprietor association is carried out through the input/output processing portion 438.

A password inspection device 700 which can be used in association with the main system according to the present invention will be described with reference to FIG. 6. The main system becomes available only when the coincidence of the password is confirmed by the password inspection device 700.

Figure 6:
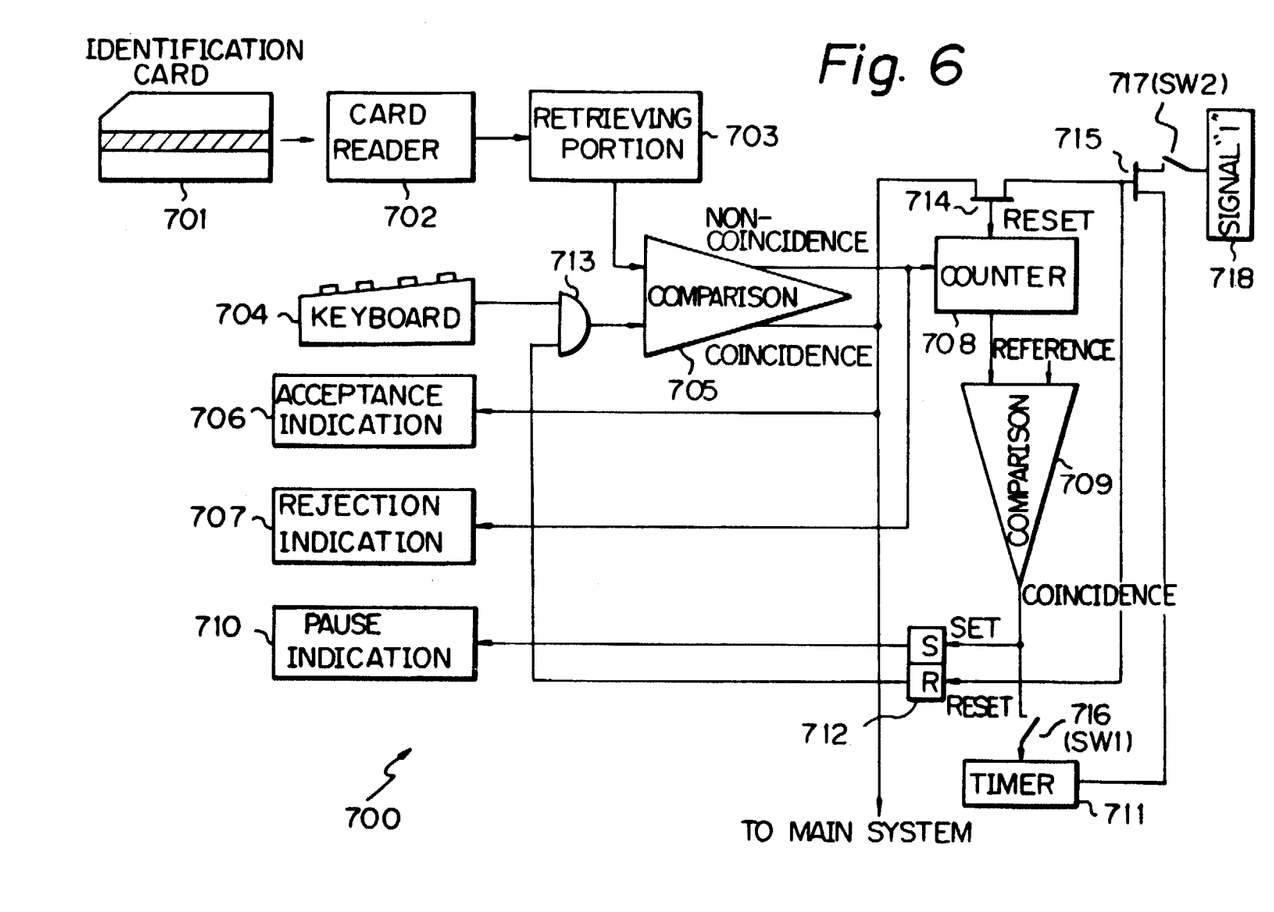
FIG. 6 is a block diagram of a password inspection device which can be used in association with the system shown in FIG. 1.

An identification card 701, such as a bank cashing service card, is used in the device 700 shown in FIG. 6. The device 700 includes a card reader 702, a retrieving portion 703, a keyboard 704, an acceptance indication portion 706, a rejection indication portion 707, a pause indication portion 710, an AND gate 713, a comparison portion 705, and a main system.

The device 700 shown in FIG. 6 also includes a counter 708, a comparison portion 709, a flip-flop circuit 712, a timer 711, switches 716 (SW1) and 717 (SW2), OR gates 714 and 715, and a signal source 718.

The retrieving portion 703 retrieves the password on the basis of the content of the identification card 701 which is read by the card reader 702. The user inputs the password or various data into the device 700 shown in FIG. 6 through the keyboard 704. The comparison portion 705 compares the password retrieved by the retrieving portion 703 with the password input through the keyboard 704. The acceptance indication portion 706 indicates INPUT ACCEPTABLE for the subsequent input when the comparison portion 705 shows coincidence of the two inputs. The rejection indication portion 707 indicates INPUT REJECTED for the subsequent input when the comparison portion 705 shows non-coincidence of the two inputs.

The count of the counter 708 is increased each time when non-coincidence is detected in the comparison portion 705 and is reset each time when coincidence is detected in the comparison portion 705. The comparison portion 709 receives the output of the counter 708 and the reference signal representing a predetermined value. When attainment of the output of the counter 708 to the predetermined value is detected in the comparison portion 709, the pause indication portion 710 indicates that the present password inspection system is at the pause state. The timer 711 responds to the output of the comparison portion 709 and counts the pause time length.

The operation of the password inspection device 700 will now be described. The user inserts his identification card 701 into the card reader 702 and inputs his password through the keyboard 704. In the initial state, the count of the counter 708 is reset to zero, and the flip-flop circuit 712 is reset.

The output of the keyboard 704 is supplied to one input terminal of the comparison portion 705. The information of the password retrieved in the retrieving portion 703 corresponding to the identification card 701 inserted in the card reader 702 is supplied to the other input terminal of the comparison portion 705. When coincidence between the two inputs is detected in the comparison portion 705, the acceptance indication portion 706 displays MAIN SYSTEM IS AVAILABLE. When non-coincidence between the two inputs is detected in the comparison portion 705, the rejection indication portion 707 displays NON-COINCIDENCE OF PASSWORD, and the count of the counter 708 is increased by one.

When coincidence between the output of the counter 708 and the reference signal is detected in the comparison portion 709, the main parts of the password inspection device 700, such as the retrieving portion 703 and the comparison portion 705, are maintained in the pause state for a predetermined time defined by the timer 711.

Under the condition that the switch 716 (SW1) is closed, when an output indicating the coincidence of the two inputs is delivered from the comparison portion 709, the operation of the timer 711 is started, and the flip-flop circuit 712 is set. Hence, the pause indication portion 710 displays the pause indication, and the flip-flop circuit 712 supplies a zero signal to one input of the AND gate 713 so that the transmission of the output of the keyboard 704 to the comparison portion 705 is forbidden. After the timer 711 counts a predetermined time length, the output of the timer 711 resets the counter 708 and the flip-flop circuit 712 so that the transmission of the output of the keyboard 704 to the comparison portion 705 becomes possible.

This predetermined time length defined by the timer 711 may be set to 30 seconds. The 30 second time length is an endurable wait for an authorized user of the identification card 701. For an unauthorized person who intends to use the identification card 701 without the knowledge of the password, it would therefore take about three days to input all the possible passwords. That is, if the input operation of the keyboard 704 takes 10 seconds and there is a 30 second pause after every, e.g., 3 counts of the counter 708, the time required to try to input all possible passwords would be about 3400 minutes.

Since the operations of the system are usually checked at least once a day in such a system, the above-described abnormal operation can be detected, and, hence, unauthorized use of the system prevented.

Instead of the manual input operation of the keyboard 704 by the user, it is possible to input the password information by electronic means, i.e., to transmit the password information electronically from a sender system to a receiver system. Such electronic input of the password information can be conducted quickly without mistakes caused by, for example, inadvertent human error. In such an electronic input method, some of the portion of the password inspection device 700, such as the counter 708 and the comparison portion 709, are not necessary, and the output of the comparison portion 705 representing the non-coincidence result of the comparison can be supplied directly to the flip-flop circuit 712 and the timer 711.

In the electronic input method of the password, the number of digits used for the password is not limited, unlike the case of the manual input method where the number of digits used for the password is advantageously limited to four due to limitations of the human memory. The time required to try to input all possible passwords for unauthorized use therefore becomes astronomical. Thus, the electronic input method is further advantageous from the viewpoint of prevention of such unauthorized use.

I claim:

1. A method for controlling access to computer software by a user, comprising the steps of:
  (a) storing proprietor and software identification, use control data, use history data and user credit data in a local computer, possessed by the user, upon storage of the computer software therein;

(b) permitting use of the computer software on the local computer in dependence upon the use control data and at least one of the use history data and the user credit data;

(c) updating the at least one of the use history data and the user credit data stored in the local computer in dependence upon the use of the computer software permitted in step (b);

(d) transmitting the at least one of the use history data and user credit data relied upon in step (b), together with the proprietor and software identification relating to the software owned by the proprietor, from the local computer to a central computer;

(e) storing on a central computer the at least one of the use history data and the user credit data by proprietor corresponding to the proprietor and software identification; and (f) controlling access to information on the central computer by each of a plurality of proprietors to obtain only the at least one of the use history data and the user credit data relating to the software owned by each proprietor.

2. A method according to claim 1, wherein said updating, transmitting, storing and controlling access of the at least one of the use history data and the user credit data in steps (c)–(f) include performing steps (c)–(f) on both the use history data and the user credit data.

3. A method according to claim 2, wherein the use history data includes at least one of length of time of use and number of times of usage, and the user credit data provides monetary information on payment for use of the computer software on the local computer.

* * * * *

UNITED STATES PATENT AND TRADEMARK OFFICE
CERTIFICATE OF CORRECTION

PATENT NO. : 5,103,392
DATED : April 7, 1992
INVENTOR(S) : Mori

It is certified that error appears in the above-indentified patent and that said Letters Patent is hereby corrected as shown below:

On the Title page, item [73], Assignee: should read "Fujitsu Limited, Kawasaki, Japan".

Signed and Sealed this

Fifth Day of April, 1994

Attest:

BRUCE LEHMAN

*Attesting Officer*

*Commissioner of Patents and Trademarks*

UNITED STATES PATENT AND TRADEMARK OFFICE
CERTIFICATE OF CORRECTION

PATENT NO. : 5,103,392
DATED : April 7, 1992
INVENTOR(S) : Mori

It is certified that error appears in the above-indentified patent and that said Letters Patent is hereby corrected as shown below:

On title page,

Delete "[73] Assignee: Fujitsu Limited, Kawasaki, Japan".

Signed and Sealed this

Twenty-sixth Day of March, 1996

Attest:

BRUCE LEHMAN

Attesting Officer

Commissioner of Patents and Trademarks